(12) United States Patent
Kamoshita

(10) Patent No.: US 12,115,863 B2
(45) Date of Patent: Oct. 15, 2024

(54) ELECTRIFIED VEHICLE

(71) Applicant: TOYOTA JIDOSHA KABUSHIKI KAISHA, Toyota (JP)

(72) Inventor: Takahiro Kamoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/147,401

(22) Filed: Dec. 28, 2022

(65) Prior Publication Data
US 2023/0278428 A1 Sep. 7, 2023

(30) Foreign Application Priority Data
Mar. 4, 2022 (JP) ................... 2022-033315

(51) Int. Cl.
*B60L 3/00* (2019.01)
(52) U.S. Cl.
CPC ................. *B60L 3/0007* (2013.01)
(58) Field of Classification Search
CPC .................................... B60L 3/0007
USPC ........................................ 307/10.1
See application file for complete search history.

(56) References Cited

U.S. PATENT DOCUMENTS

| 9,914,336 | B2 * | 3/2018 | Smith ............... B60L 50/66 |
| 10,358,169 | B2 * | 7/2019 | Miller .............. B60K 1/04 |
| 10,399,455 | B2 * | 9/2019 | Sugitate ........... H01M 10/615 |
| 2020/0079200 | A1 * | 3/2020 | Suzuki ............. B60K 1/00 |
| 2020/0079305 | A1 * | 3/2020 | Takizawa .......... B60L 53/16 |
| 2020/0086736 | A1 * | 3/2020 | Tomita ............. B60R 13/00 |
| 2020/0247225 | A1 * | 8/2020 | Kochi ............... B60K 11/04 |

FOREIGN PATENT DOCUMENTS

| JP | 2013-103587 A | 5/2013 |
| JP | 2016-060324 A | 4/2016 |
| JP | 2018-122825 A | 8/2018 |
| JP | 2020-044992 A | 3/2020 |

* cited by examiner

*Primary Examiner* — Alfonso Perez Borroto
(74) *Attorney, Agent, or Firm* — Oliff PLC

(57) ABSTRACT

An electrified vehicle includes: a vehicle body including a panel body on which a projection is provided; a high voltage cable disposed at a position facing the projection; a member attached to the panel body and including a protector portion configured to cover the projection; and a resin connector for low voltage, the resin connector being attached to the protector portion and placed between the protector portion and the high voltage cable. As an example, the panel body may be a dash panel, and the projection may be a stud bolt.

5 Claims, 3 Drawing Sheets

ELECTRIFIED VEHICLE

CROSS-REFERENCE TO RELATED APPLICATION

This application claims priority to Japanese Patent Application No. 2022-033315 filed on Mar. 4, 2022, incorporated herein by reference in its entirety.

BACKGROUND

1. Technical Field

The technology described in the present specification relates to an electrified vehicle. The electrified vehicle as used herein widely indicates a vehicle including a drive motor for driving wheels and includes, for example, a battery electric vehicle (BEV), a hybrid electric vehicle (HEV), a plug-in hybrid electric vehicle (PHEV), a fuel cell electric vehicle (FCEV), and so on.

2. DESCRIPTION OF RELATED ART

An electrified vehicle is described in Japanese Unexamined Patent Application Publication No. 2016-060324 (JP 2016-060324 A). The electrified vehicle includes a drive motor and a power converter. The drive motor and the power converter are placed inside a front compartment of a vehicle body and are connected to each other via a high voltage cable. The high voltage cable is held by a bracket of the power converter and is configured to be protected by the bracket when the electrified vehicle has a collision.

SUMMARY

A stud bolt may be provided on a dash panel of the vehicle body. In this case, in a case where a high voltage cable is disposed at a position facing the stud bolt, when the electrified vehicle has a collision, the high voltage cable might be damaged. Such a problem is not limited to the stud bolt of the dash panel. That is, even in a case where a projection is provided on a panel body constituting the vehicle body and the high voltage cable is disposed at a position facing the projection, the problem may also occur. In view of the above problem, the present specification provides a technology to protect a high voltage cable in an electrified vehicle.

The technology described in the present specification is embodied in the form of an electrified vehicle. The electrified vehicle includes a vehicle body, a high voltage cable, a member, and a resin connector for a low-voltage wiring line. The vehicle body includes a panel body on which a projection is provided. The high voltage cable is disposed at a position facing the projection. The member is attached to the panel body and includes a protector portion configured to cover the projection. The resin connector is attached to the protector portion and placed between the protector portion and the high voltage cable.

In the electrified vehicle, the projection provided on the panel body is covered with the protector portion of the member attached to the panel body. Further, the resin connector for a low-voltage wiring line is attached to the protector portion. With such a configuration, the protector portion and the resin connector are both provided between the projection provided on the panel body and the high voltage cable facing the projection. Hereby, even in a case where the electrified vehicle has a collision, for example, it is possible to restrain the high voltage cable from making contact with the projection.

Here, a high voltage in the present specification indicates a working voltage with direct current over 60 volts or a working voltage with alternating current over 30 volts (effective value), and a low voltage indicates a working voltage that does not correspond to such a high voltage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
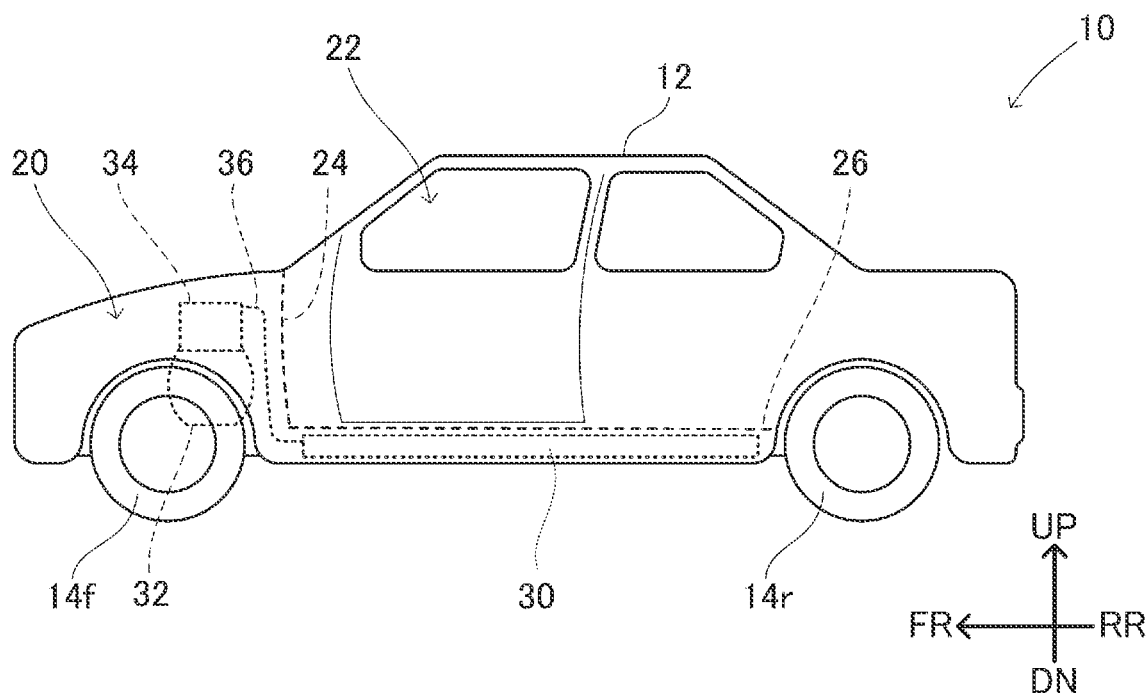
FIG. 1 schematically illustrates an overall configuration of an electrified vehicle 10 of an embodiment.

In one aspect of this technology, at least part of an outer peripheral edge of the resin connector may be placed outwardly from an outer peripheral edge of the protector portion in a direction perpendicular to the projection. With such a configuration, when the high voltage cable makes contact with the resin connector, the resin connector is supported by an outer peripheral wall of the protector portion. This makes it possible to prevent the protector portion from being easily damaged and to effectively restrain the high voltage cable from making contact with the projection.

In one aspect of this technology, the member including the protector portion may be made of resin. In addition to or instead of this, the member including the protector portion may be a bracket configured to hold a low-voltage wire harness.

In one aspect of this technology, the panel body may be a dash panel placed between a front compartment and a cabin of the vehicle body. In this case, the high voltage cable may be placed inside the front compartment. Note that the panel body is not limited to the dash panel and may be other panel bodies constituting the vehicle body.

In one aspect of this technology, the projection may be a stud bolt. The stud bolt has a relatively sharp edge, and if the stud bolt makes contact with the high voltage cable, the stud bolt is highly likely to damage the high voltage cable. The technology described in the present specification can be preferably applied to such a stud bolt. Note that the projection is not limited to the stud bolt and may be other types of projection.

In one aspect of the technology, the electrified vehicle may further include a direct-current power supply, a drive motor, and a power converter electrically provided between the direct-current power supply and the drive motor. In this case, the high voltage cable may be a cable for direct-current power via which the direct-current power supply is electrically connected to the power converter.

With reference to the drawings, an electrified vehicle 10 of an embodiment will be described. The electrified vehicle 10 of the present embodiment is not limited particularly. However, the electrified vehicle 10 is an electrified vehicle configured to travel on a road surface and is a so-called battery electric vehicle (BEV). Note that the electrified vehicle 10 is not limited to the battery electric vehicle and may be a hybrid electric vehicle (HEV), a plug-in hybrid electric vehicle (PHEV), or a fuel cell electric vehicle (FCEV).

Here, a direction FR in the drawings indicates the front side in the front-rear direction of the electrified vehicle 10, and a direction RR indicates the rear side in the front-rear direction of the electrified vehicle 10. Further, a direction LH indicates the left side in the right-left direction (or the width direction) of the electrified vehicle 10, and a direction RH indicates the right side in the right-left direction of the electrified vehicle 10. Further, a direction UP indicates the upper side in the up-down direction of the electrified vehicle 10, and a direction DW indicates the lower side in the up-down direction of the electrified vehicle 10. Note that, in the present specification, the front side FR, the rear side RR, the left side LH, the right side RH, the upper side UP, and the lower side DW in the electrified vehicle 10 may be just referred to as the front side, the rear side, the left side, the right side, the upper side, and the lower side, respectively.

As illustrated in FIG. 1, the electrified vehicle 10 includes a vehicle body 12 and a plurality of wheels 14*f*, 14*r*. The vehicle body 12 is not limited particularly, but the vehicle body 12 is mainly made of metal. Inside the vehicle body 12, a front compartment and a cabin 22 placed behind the front compartment 20 are provided. The cabin 22 is configured such that one or more users can board. The vehicle body 12 includes a dash panel 24 and a floor panel 26. The dash panel 24 is a panel body expanding in the up-down direction and the right-left direction, and the dash panel 24 is placed between the front compartment 20 and the cabin 22. The floor panel 26 is a panel body expanding in the front-rear direction and the right-left direction, and the floor panel 26 is placed below the cabin 22.

The wheels 14*f*, 14*r* are rotatably supported by the vehicle body 12. The wheels 14*f*, 14*r* include a pair of front wheels 14*f* and a pair of rear wheels 14*r*. The front wheels 14*f* are placed in a front part of the vehicle body 12, and the rear wheels 14*fr* are provided in a rear part of the vehicle body 12. The front wheels 14*f* are disposed coaxially with each other, and the rear wheels 14*r* are disposed coaxially with each other. The front wheels 14*f* are steering wheels configured such that respective orientations of their rotating shafts are changed by the operation of a user.

The electrified vehicle 10 further includes a battery 30, a motor 32, a power converter 34, and a high voltage cable 36. The battery 30 is a direct-current power supply configured to supply electric power to the motor 32. The battery 30 is electrically connected to the motor 32 via the power converter 34. The battery 30 includes a plurality of secondary battery cells and is configured to be chargeable repeatedly by charge power supplied from its outside or regenerative electric power generated by the motor 32. Although the battery 30 is not limited in particular, the battery 30 is placed below the floor panel 26 and is connected to the power converter 34 by use of the high voltage cable 36.

The motor 32 is a drive motor for driving the front wheels 14*f* and is mechanically connected to the front wheels 14*f*. The power converter 34 includes an inverter and can perform power conversion between direct-current power and alternating-current power. For example, in a case where the motor 32 drives the front wheels 14*f*, the power converter 34 converts direct-current power from the battery 30 into alternating-current power and supplies the alternating-current power to the motor 32. In the meantime, in a case where the motor 32 performs regenerative braking on the front wheels 14*f*, the power converter 34 converts alternating-current power from the motor 32 into direct-current power and supplies the direct-current power to the battery 30. Note that the power converter 34 may further include a DC-DC converter in addition to the inverter.

Figure 2:
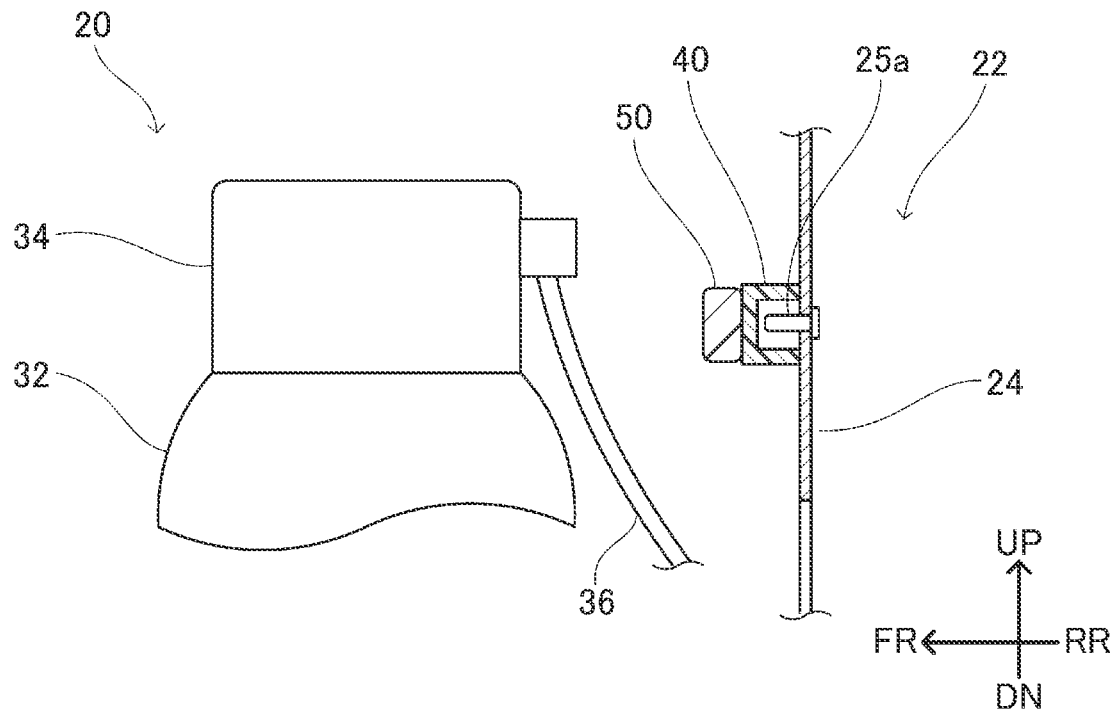
FIG. 2 schematically illustrates a configuration of an essential part of the electrified vehicle 10 of the embodiment.
Figure 3:
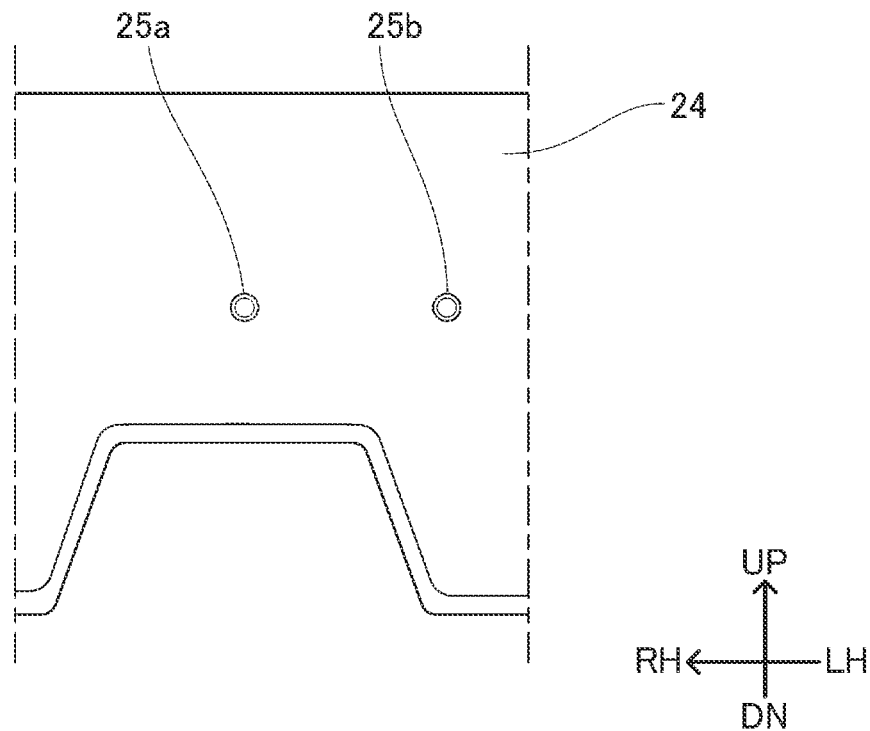
FIG. 3 illustrates a front surface of a dash panel 24 on which stud bolts 25a, 25b are provided (a protector 40 and a resin connector 50 are not illustrated)
Figure 4:
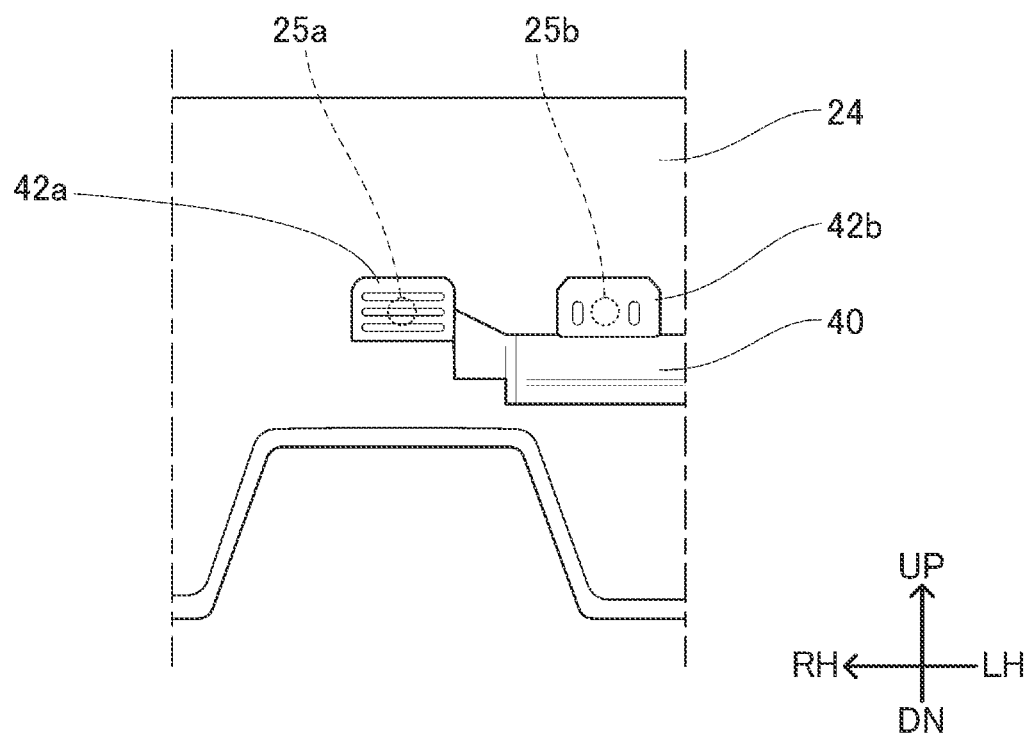
FIG. 4 illustrates the dash panel 24 to which the protector 40 is attached (the resin connector 50 is not illustrated)
Figure 5:
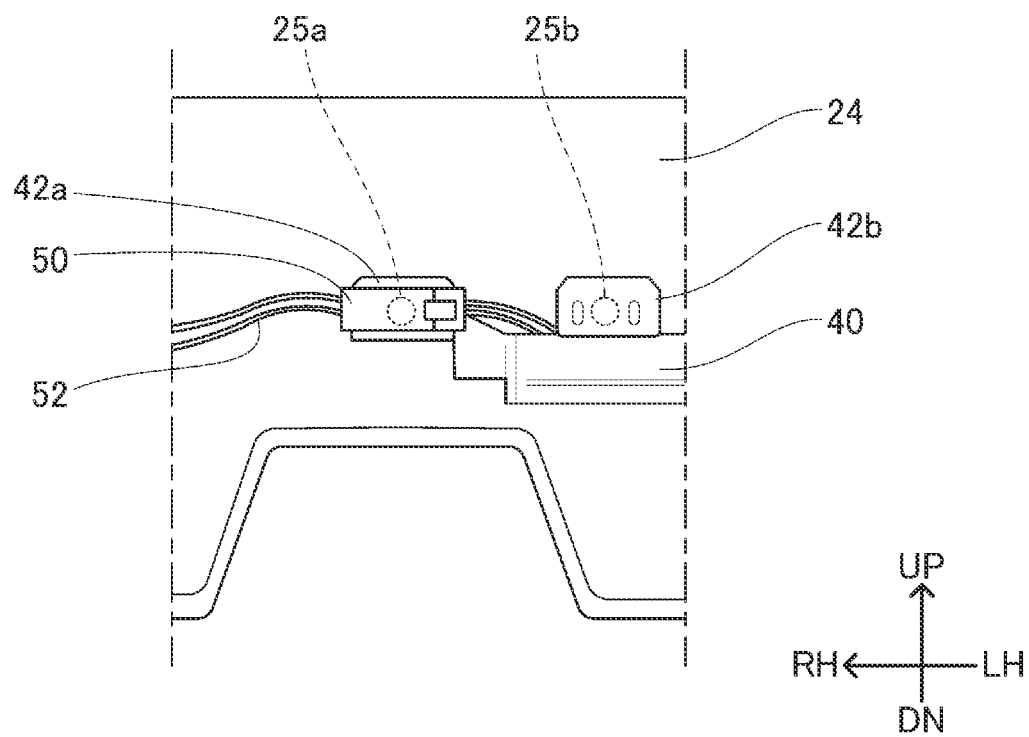
FIG. 5 illustrates the dash panel 24 to which the protector 40 and the resin connector 50 are attached.

As illustrated in FIGS. 1 and 2, the motor 32 and the power converter 34 are placed inside the front compartment 20. The high voltage cable 36 is a cable for direct-current power and electrically connects the battery 30 and the power converter 34 to each other. The high voltage cable 36 extends from the battery 30 placed below the floor panel 26 to the power converter 34 placed inside the front compartment 20 such that the high voltage cable 36 is placed between the power converter 34 and the dash panel 24.

Here, the motor 32 is not limited to driving the front wheels 14*f*, provided that the motor 32 is configured to drive at least one of the wheels 14*f*, 14*r*. Further, the electrified vehicle 10 may include other driving motors such as an engine in addition to the motor 32. Further, the electrified vehicle 10 may include other direct-current power supplies such as a fuel cell unit or a solar panel in addition to or instead of the battery 30. Further, the electrified vehicle 10 of the present embodiment is not limited to a vehicle operated by a user and includes a vehicle remotely controlled by an external apparatus or the electrified vehicle that autonomously travels.

As illustrated in FIGS. 2 to 5, the dash panel 24 includes a plurality of stud bolts 25*a*, 25*b*. The stud bolts 25*a*, 25*b* are fixed to the dash panel 24 and project from the dash panel 24 into the front compartment 20. In such a configuration, in a case where the electrified vehicle 10 has a collision, for example, a mounted component inside the front compartment 20 might make contact with the stud bolts 25*a*, 25*b*. In view of this, a protector is attached to the dash panel 24. The protector 40 includes a plurality of protector portions 42*a*, 42*b* provided such that the protector portions 42*a*, 42*b* cover the stud bolts 25*a*, 25*b*. Although the protector 40 is not limited particularly, the protector 40 in the present embodiment is made of resin. Note that the protector 40 protects a low-voltage wire harness disposed along the dash panel 24 as well as the stud bolts 25*a*, 25*b*.

The protector portions 42*a*, 42*b* include a first protector portion 42*a* and a second protector portion 42*b*. The first protector portion 42*a* is placed to cover a first stud bolt 25*a* out of the stud bolts 25*a*, 25*b*. The second protector portion 42*b* is placed to cover a second stud bolt 25*b* out of the stud bolts 25*a*, 25*b*. Note that, in the present embodiment, two stud bolts 25*a*, 25*b* and two protector portions 42*a*, 42*b* are illustrated, but the number of the stud bolts 25*a*, 25*b* and the number of the protector portions 42*a*, 42*b* are not limited to two.

As described above, when the stud bolts 25*a*, 25*b* on the dash panel 24 are covered with the protector portions 42*a*, 42*b* of the protector 40, a mounted component inside the front compartment 20 is restrained from making contact with the stud bolts 25*a*, 25*b*. However, the high voltage cable 36 is disposed between the power converter 34 and the dash panel 24. In such a configuration, when the electrified vehicle 10 has a collision, for example, the high voltage cable 36 might be pressed against the dash panel 24 by the power converter 34. Particularly, the high voltage cable 36 is disposed at a position facing the first stud bolt 25*a*.

Accordingly, in a case where the high voltage cable 36 is pressed against the dash panel 24 by the power converter 34, even when the first protector portion 42a is provided between the high voltage cable 36 and the first stud bolt 25a, there is such a concern that the high voltage cable 36 makes contact with the first stud bolt 25a.

In order to deal with such a concern, in the electrified vehicle 10 of the present embodiment, a resin connector 50 is attached to the first protector portion 42a. The resin connector 50 is a resin connector provided for a low-voltage wiring line 52. The resin connector 50 is fixed to a front surface of the first protector portion 42a and is placed between the first protector portion 42a and the high voltage cable 36. With such a configuration, the first protector portion 42a and the resin connector 50 are both provided between the stud bolt 25a on the dash panel 24 and the high voltage cable 36 facing the stud bolt 25a. Hereby, even in a case where the high voltage cable 36 is pressed against the dash panel 24 by the power converter 34 due to the occurrence of a collision in the electrified vehicle 10 or the like, for example, it is possible to restrain the high voltage cable 36 from making contact with the stud bolt 25a.

The shape or the size of the resin connector 50 is not limited in particular. Note that, in the electrified vehicle 10 of the present embodiment, in directions (that is, the right-left direction and the up-down direction) perpendicular to the stud bolt 25a, at least part of an outer peripheral edge of the resin connector 50 is placed outwardly from an outer peripheral edge of the first protector portion 42a. With such a configuration, when the high voltage cable 36 makes contact with the resin connector 50, the resin connector 50 is supported by an outer peripheral wall of the first protector portion 42a. This makes it possible to prevent the first protector portion 42a from being easily damaged and to effectively restrain the high voltage cable 36 from making contact with the stud bolt 25a.

The electrified vehicle 10 of the present embodiment is one embodiment of the technology described in the present specification, and various modifications can be made within the scope of the technology described in the present specification. For example, the dash panel 24 in the present embodiment is an example of a panel body in the technology described in the present specification and does not limit the panel body. Further, the first stud bolt 25a in the present embodiment is an example of a projection in the technology described in the present specification and does not limit the projection. Further, the battery in the present embodiment is an example of a direct-current power supply in the technology described in the present specification and does not limit the direct-current power supply.

The embodiment has been described above in detail, but the embodiment is only an example and does not limit the scope of Claims. The technology described in the scope of Claims includes the foregoing concrete examples with various modifications and changes. Each of and various combinations of the technical elements described in the present specification or the drawings achieve a technical usefulness, and the technical elements are not limited to the combinations stated in the claims at the time of filing. Further, the technology described in the present specification or the drawings can achieve a plurality of objects at the same time and has a technical usability by achieving one of those objects.

What is claimed is:

1. An electrified vehicle comprising:
    a vehicle body including a panel body on which a plurality of stud bolts are provided;
    a high voltage cable disposed at a position facing the plurality of stud bolts
    a plurality of first protector portions and a second protector portion attached to the panel body; and
    a resin connector being an electrical connector for a low-voltage wiring line, wherein
    each first protector portion of the plurality of first protector portions is configured to completely cover a corresponding stud bolt of the plurality of stud bolts, as viewed from a front side of the electrified vehicle,
    the second protector portion is configured to cover the low-voltage wiring line disposed along the panel body, and
    the resin connector is attached to a front surface of a corresponding first protector portion of the plurality of first protector portions, and is placed between the corresponding first protector portion and the high voltage cable in a width direction of the electrified vehicle.

2. The electrified vehicle according to claim 1, wherein at least part of an outer peripheral edge of the resin connector is placed outwardly from an outer peripheral edge of the corresponding first protector portion in a direction perpendicular to the plurality of stud bolts.

3. The electrified vehicle according to claim 1, wherein the plurality of first protector portions and the second protector portion are made of resin.

4. The electrified vehicle according to claim 1, wherein:
    the panel body is a dash panel placed between a front compartment and a cabin of the vehicle body; and
    the high voltage cable is placed inside the front compartment.

5. The electrified vehicle according to claim 1, further comprising:
    a direct-current power supply;
    a drive motor; and
    a power converter electrically provided between the direct-current power supply and the drive motor, wherein the high voltage cable is a cable for direct-current power via which the direct-current power supply is electrically connected to the power converter.

* * * * *